Nov. 18, 1952                    W. RINKER                     2,618,069
                              MEASURING DEVICE
Filed March 7, 1950                                      2 SHEETS—SHEET 1
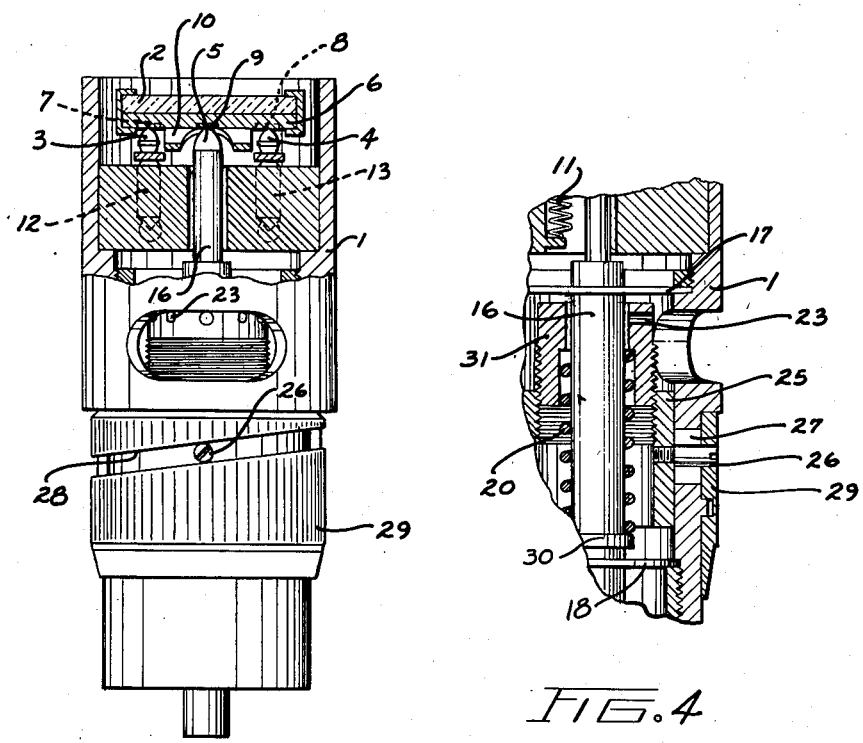
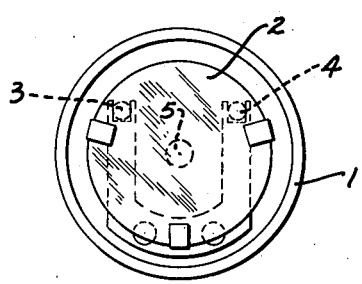
INVENTOR.
WILHELM RINKER
BY *Fred A. Klein*
ATTORNEY Nov. 18, 1952 W. RINKER 2,618,069
MEASURING DEVICE
Filed March 7, 1950 2 SHEETS—SHEET 2

INVENTOR.
WILHELM RINKER
BY Fred O. Klein
ATTORNEY

Patented Nov. 18, 1952

2,618,069

UNITED STATES PATENT OFFICE 2,618,069

MEASURING DEVICE

Wilhelm Rinker, Wetzlar, Germany, assignor to Ernst Leitz, G. m. b. H., Wetzlar, Germany, a German corporation Application March 7, 1950, Serial No. 148,031
In Germany November 6, 1948

11 Claims. (Cl. 33—169)

The present invention relates to measuring devices, such as micrometers, and more particularly to improvements in the arrangement of a tiltable mirror, known per se and used to transmit very small displacements of the measuring rod of the micrometer.

It is an object of this invention to provide a micrometer with a titltable mirror whose movements are simply and accurately controlled so as to permit most accurate readings of the minutest distance and tolerance measurements. It is a further object of the invention to provide a compact structure for such a micrometer which is adapted for easy manipulation and adjustment.

In accordance with the invention, the measuring rod of the micrometer is suspended within its housing and is adapted to support the mirror and to tilt it about an axis formed by two other mirror supports. The measuring rod suspension means may be two thin flexible elements or reeds connected to the housing and attached to the rod. The tiltable mirror may be held against transverse displacement by any suitable means, such as a spring blade which does not appreciably oppose the tilting movement of the mirror and whose pressure remains constant throughout the axial displacement of the measuring rod and the resultant tilting of the mirror. The mirror is held against its three supports by spring means adapted to exert all or part of the measuring pressure. If desired, the mirror may be mounted on a support plate which will preferably be provided with hard metal discs at the points where the mirror supports abut thereagainst whereby deformation of these surfaces will be prevented.

In a preferred embodiment of the invention, the measuring rod is held under the pressure of a supplementary spring which may be arranged so as to add to or oppose the pressure of the first spring. There may also be provided adjustment means for controlling the tension of said supplementary spring. If the supplementary spring is arranged to oppose the effect of the first spring, the tension may be so adjustable that the resulting measuring pressure is variable between zero and a predetermined maximum value. If the supplementary spring is so mounted as to exert its pressure in the same direction as the first spring, whereby the pressures of both springs are added to each other, the tension of the supplementary spring may be adjustable between the pressure of the first spring and the pressure resulting from the first spring added to that of the supplementary spring.

In accordance with another feature of the invention, the adjustment means for controlling the tension of the supplementary spring comprises a sleeve having an end wall and surrounding the measuring rod, one end of said spring abutting against the end wall and the other end against the measuring rod, and means actuable from outside the micrometer housing and adapted to move said sleeve axially in respect to the measuring rod, whereby the spring tension may be varied. In the embodiments shown in the accompanying drawings, the latter means comprises a series of circularly arranged apertures at one portion of the sleeve, said apertures being engageable from the outside through a port-hole or window in the housing.

The sleeve holding the supplementary spring may be threadedly connected with another sleeve which is axially displaceable within the housing but is secured against rotation. In the latter arrangement, the supplementary spring tension is adjusted by engaging one of said apertures in the first sleeve and turning the same into one or the other direction whereby the first sleeve is screwed into or out of the second sleeve.

It is desirable to release the spring tension against the suspension means of the measuring rod entirely when the micrometer is not in use. This may be accomplished, in accordance with a still further feature of the invention, by providing the second or outer sleeve with a fixed guide pin adapted to fit into an inclined, transverse groove provided in a rotatable knob mounted on the micrometer housing. By turning said knob, the guide pin, following the course of the inclined groove, is axially displaced, thereby moving the sleeve holding the supplementary spring in relation to the measuring rod until the spring tension is released.

The above objects, features and advantages of the invention will become more apparent from the following detailed description taken in connection with the accompanying drawings which are illustrative of the invention, and in which:

Figure 1 shows, partly in front section, one embodiment of the micrometer assembly;

Figure 3 is a top view of the mirror arrangement;

Figure 4 shows, in section, another embodiment of the invention, wherein the supplementary spring is adapted to reenforce the tension of the mirror spring.

Figure 2:
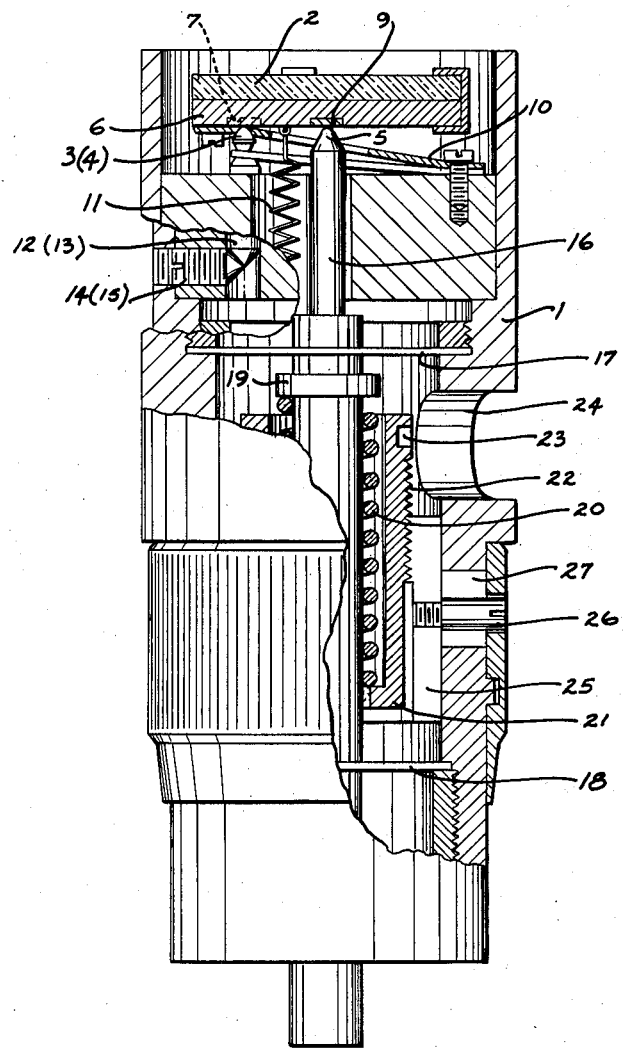
Figure 2 is an enlarged side view of Figure 1, partly in section.

Referring now to the drawings, wherein like numerals in all figures refer to like parts, there is provided, in the upper part of the micrometer housing 1, a mirror 2, supported by a plate 6 resting on three ball supports 3, 4, 5, which abut against the hard metal disks 7, 8, 9. In order to prevent transverse motion of the mirror, it is held in place by the spring blade 10. The spring 11 is connected to and acts on the mirror at about the center of gravity of a triangle formed by the three ball supports 3, 4, 5, holding the mirror thereagainst and serving simultaneously as load spring for the measuring pressure. Mirror 2 is fastened to plate 6 in such manner that it is not affected by the forces acting on the plate, but follows only its tilting movements.

Ball supports 3, 4 are arranged on pins 12, 13 and may be adjusted by turning adjusting screws 14, 15 which are adapted to cooperate with the cone-like ends of the pins, said screws being arranged transversely relative to the cones. Tilting support 5 is carried by measuring rod 16 which is suspended in housing 1 between two membranes 17, 18. The supplementary spring 20 is coaxial with the measuring rod 16 and as shown in Fig. 2, is held between collar 19 and the end wall of sleeve 21. Sleeve 21 is provided with screw threads 22 and its upper end is provided with a circularly arranged series of apertures 23. Opposite the apertures 23 there is provided a port-hole or window 24 and by means of a pin inserted into any one of said apertures 23, the sleeve 21 can be rotated. Sleeve 21 is threadedly connected to sleeve 25 which is axially displaceable in housing 1 and is provided with guide pin 26. The guide pin reaches through opening 27 in housing 1 into the transverse groove 28 of a knurled knob 29 which is rotatably but not axially displaceably mounted on housing 1. By rotating the knurled knob, guide pin 26, the sleeves 25 and 21 may be axially displaced whereby the supplementary spring 20 is tensioned or released depending on the direction of displacement.

In the above described embodiment of the invention, the actions of spring 11 and spring 20 are opposed to each other. In this case, spring 11 must be strong enough to sustain the total and highest-attainable measuring pressure. Adjustment of spring 20 by means of rotating sleeve 21 relative to sleeve 25, permits variation of the measuring pressure, between the values of zero and the highest load attainable by spring 11.

If it is desired to keep spring 11 as weak as possible and have the measuring pressure delivered by supplementary spring 20, springs 11 and 29 may be arranged so as to exert their pressure in the same direction. As shown in Fig. 4, this may be accomplished by having the end of supplementary spring 20 which is farther removed from the mirror, act on collar 30 of the measuring rod 16, while the near end of spring 20 presses against the end wall of sleeve 31. In this arrangement, the spring 11 holds mirror 2 with constant tension on ball supports 3, 4, 5, the measuring pressure being largely delivered by supplementary spring 20.

It will be understood that the above description is merely illustrative and in no way limitative of the invention and that changes and variations may be made in the details of construction without departing from the spirit and scope of the invention as defined in the appended claims.

What is claimed is:

1. A measuring device comprising a housing, a measuring rod, two annular reeds fixedly attached at their outer peripheries to said housing and at their inner peripheries to said measuring rod for freely suspending the measuring rod in the housing, a plane mirror supported by two support members and said measuring rod, said measuring rod being adapted to tilt said mirror around the axis formed by said two support members, a spring blade one end of which is attached to the housing and the other end of which is attached to the mirror for holding said tiltable mirror against transverse displacement, spring means for holding said mirror against its supports, further spring means coaxial with and acting upon said measuring rod, a sleeve surrounding said further spring means and having an end wall abutting one end of said spring means, the other end thereof abutting said measuring rod, and means actuable from the outside of said housing and adapted to move said sleeve axially in respect to said measuring rod, whereby said further spring means may be compressed or extended and its tension varied accordingly.

2. A measuring device comprising a housing, a measuring rod, two reeds connected to said housing and attached to said measuring rod for freely suspending the measuring rod in the housing, a plane mirror supported by two support members and said measuring rod, said measuring rod being adapted to tilt said mirror around the axis formed by said two support members, a spring blade one end of which is attached to the housing and the other end of which is attached to the mirror for holding said tiltable mirror against transverse displacement, spring means for holding said mirror against its supports, further spring means coaxial with and acting upon said measuring rod, a sleeve surrounding said further spring means and having an end wall abutting one end of said spring means, the other end thereof abutting said measuring rod, and means actuatable from the outside of said housing and adapted to move said sleeve axially in respect to said measuring rod, whereby said further spring means may be compressed or extended and its tension varied accordingly.

3. A measuring device comprising a housing, a measuring rod, two thin flexible elements connected to said housing and attached to said measuring rod for freely suspending the measuring rod in the housing, a plane mirror supported and tiltable by said measuring rod, further support means for said mirror forming the tilting axis, spring means holding the mirror against its said supports, and a spring blade one end of which is attached to said housing and the other end of which is attached to the mirror for holding the mirror against transverse displacement.

4. Measuring device in accordance with claim 2, comprising means for preventing appreciable deformation of the surface resting upon said two support members and said measuring rod.

5. Measuring device in accordance with claim 4, wherein said means comprises hard metal surfaces.

6. An adjustment device for varying the tension of a helical spring arranged around a rod having a collar, said rod being enclosed in a housing, comprising: an axially displaceable sleeve having an end wall, a series of circularly arranged element carried by said sleeve, a window provided in said housing opposite said elements, said elements being engageable through said window from the outside of the housing, whereby said sleeve may be rotated in respect to said rod, said helical spring being held between said end wall and said collar on said rod, whereby said spring may be compressed and extended, depending on the direction in which said sleeve is rotated.

7. An adjustment device for varying the tension of a helical spring arranged around a rod having a collar, said rod being enclosed in a housing, comprising: an axially displaceable sleeve having an end wall, a second sleeve threadedly connected therewith, said second sleeve being axially displaceable within the housing but being secured against rotation, said spring being held between said end wall and said collar on said rod, and means actuatable from the outside of the housing and adapted to screw the first sleeve into and out of said second sleeve, whereby said spring may be compressed and extended, depending on the direction in which said first sleeve is moved.

8. Adjustment device in accordance with claim 7, comprising means mounted on said housing for axially displacing the second sleeve within said housing, whereby the entire sleeve and spring assembly may be moved within said housing.

9. Adjustment device in accordance with claim 8, comprising a guide member fixedly attached to said second sleeve and adapted to fit into an inclined, transverse groove provided in a rotatable knob mounted on said housing.

10. A measuring device comprising a housing, a measuring rod, two thin flexible annular elements fixedly attached at their outer peripheries to said housing and at their inner peripheries to said measuring rod for freely suspending the measuring rod in the housing, a plane mirror supported and tiltable by said measuring rod, further support means for said mirror forming the tilting axis, spring means holding the mirror against its said supports, and a spring blade one end of which is attached to said housing and the other end of which is attached to the mirror for holding the mirror against transverse displacement.

11. A measuring device as defined in claim 3 comprising further spring means acting upon said measuring rod, and means for adjusting the tension of said further spring means.

WILHELM RINKER.

REFERENCES CITED

The following references are of record in the file of this patent:

UNITED STATES PATENTS

| Number | Name | Date |
|---|---|---|
| 766,677 | Eagle | Aug. 2, 1904 |
| 1,133,585 | Simons | Mar. 30, 1915 |
| 1,854,838 | Hartsough | Apr. 19, 1932 |
| 2,224,281 | Webber | Dec. 10, 1940 |
| 2,307,950 | Plaut et al. | Jan. 12, 1943 |

FOREIGN PATENTS

| Number | Country | Date |
|---|---|---|
| 65,551 | Austria | July 10, 1914 |
| 253,521 | Germany | Nov. 11, 1912 |
| 362,913 | Germany | Mar. 19, 1921 |